United States Patent

[11] 3,628,388

| [72] | Inventors | Pierre Bouthors;<br>Philippe Quemerais, both of Billancourt, France |
|---|---|---|
| [21] | Appl. No. | 880,077 |
| [22] | Filed | Nov. 26, 1969 |
| [45] | Patented | Dec. 21, 1971 |
| [73] | Assignees | Regie Nationale Des Usines Renault Billancourt, ;<br>Automobiles Peugeot Paris, France |
| [32] | Priority | Dec. 12, 1968 |
| [33] | | France |
| [31] | | 177941 |

[54] FRICTION-TYPE VARIABLE-SPEED TRANSMISSIONS
4 Claims, 8 Drawing Figs.

[52] U.S. Cl............................................................ 74/199
[51] Int. Cl............................................................ F16h 15/14
[50] Field of Search............................................ 74/199

[56] References Cited
UNITED STATES PATENTS

| 1,823,226 | 9/1931 | Abbott, Jr. .................. | 74/199 |
| 2,222,281 | 11/1940 | Beier............................ | 74/199 X |
| 3,060,758 | 10/1962 | Kano............................ | 74/199 |
| 3,158,036 | 11/1964 | Hughson ..................... | 74/199 |
| 3,381,777 | 5/1968 | Flichy........................... | 74/199 X |
| 3,387,507 | 6/1968 | De Castelet ................. | 74/199 X |
| 3,453,904 | 7/1969 | Dangauthier................. | 74/199 X |

FOREIGN PATENTS

| 959,796 | 3/1957 | Germany...................... | 74/199 |

Primary Examiner—Carlton R. Croyle
Assistant Examiner—Thomas C. Perry
Attorney—Stevens, Davis, Miller & Mosher ABSTRACT: Variable-speed transmission of the type comprising a disc interposed between a pair of rings coacting therewith through corresponding friction surfaces, and a driving shaft to which said disc is attached and a driven shaft parallel to said driving shaft and rigid with a drum in which said rings are mounted, said driven shaft being adapted to move transversely about a lay shaft parallel thereto for producing the desired speed variation.

PATENTED DEC 21 1971
3,628,388
SHEET 1 OF 2
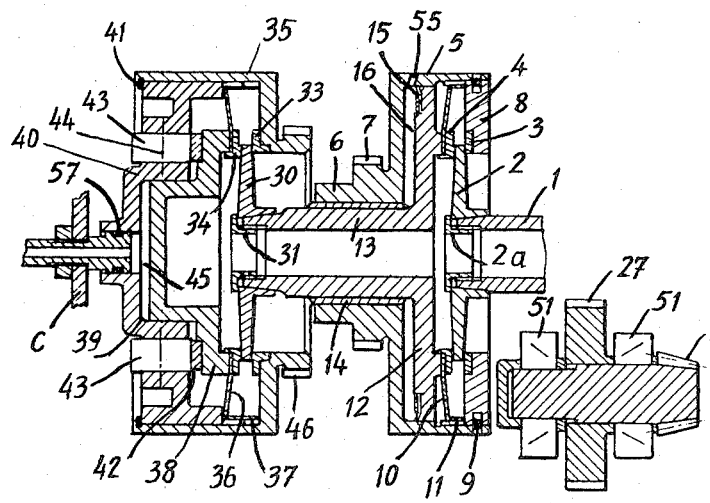
FIG.1
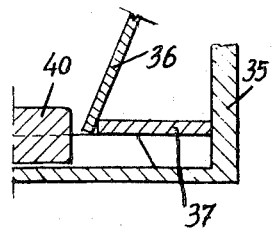
FIG.8
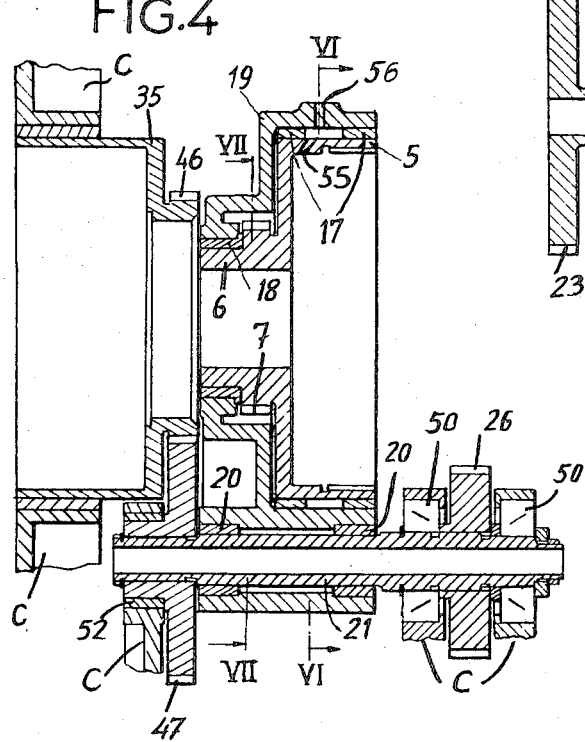
FIG.4
FIG.5

FRICTION-TYPE VARIABLE-SPEED TRANSMISSIONS

Various forms of friction-type variable-speed transmissions are already known which comprise multiple discs or like members having tapered friction surfaces with the apex angle, the driving and driven members being externally or internally tangent and having parallel axes of rotation of which the relative position can be varied for changing the transmission gear ratio.

Among these known systems those utilizing internally tangent male and female tapered surfaces are attended by specific advantageous features, for when the axes of the driving and driven members are merged into one, the male and female surfaces engage each other throughout their circumference, thus providing a direct-drive coupling.

Multidisc variable-speed transmissions are also known wherein the driving discs and the driven discs are rotatably rigid with driving shafts and driven drums, respectively, through the medium of splines.

In variable-speed transmissions of this character the discs are mounted for axial sliding movement in their splines. Of course, this axial movement is counteracted by considerable frictional forces if a torque is transmitted by the mechanism during this movement. In general the driving discs formed with internal splines develop the greatest resistance to this axial movement, even if adequate lubrication means are provided. It was also observed that defects resulting from an insufficiently accurate machining of said discs are a source of parasitic frictional forces causing a variation in the disc clamping action, thus creating interferences in the momentary torque transmission on account of the variable slip produced between the driving and driven discs.

In known multiple-disc variable-speed transmission mechanisms the axial stress required for clamping the male driving discs or the hollow driven discs may be obtained by using resilient or spring washers, or ramps or cam faces transmitting a reaction torque. Obviously, it will be rather difficult to cause the washer pressures to be responsive or proportional to the transmitted torque, for this torque depends only on the geometrical characteristics of the variable-speed transmission. When this pressure is created by using a roller and ramp device, it is subordinate to the output torque according to a rigid law determined by a test-and-try method rather difficult to ascertain since the pressure giving the optimum or maximum efficiency can be obtained only by determining the ramp slope or cam contour as a function of the various efficiency curves obtained with different types of ramps or cam faces. This method is therefore time robbing and attended by the risk of committing errors when appreciating the result.

Hitherto known variable-speed transmissions have a very moderate slip factor since the angular discrepancy between the speeds measured at the point of mutual engagement between the driving and driven discs is subordinate to the choice of the ramps or washers, as a function of the axial pressure involved. Thus, the torque-transmitting discs cannot under any circumstance be utilized as torque limiting members, or as clutch means, since any slip increment is attended by a hardly permissible overheating of the discs, notably in their zones of mutual engagement.

In a known construction driving or transmission rings liable to undergo a certain distortion are substituted for the driven discs and produce by their elastic deformation the axial effort necessary for transmitting the torque. Due to the eccentric reaction of this effort these driving rings are subjected to relatively high cyclical strain increasing rapidly with the power output to be transmitted. It is therefore clear that the useful life of a device of this character is thus impaired and that it is hardly suited for the automobile industry.

This invention provides a friction-type variable-speed transmission which avoids the inconveniences set forth hereinabove.

The transmission according to this invention, which constitutes a variable-speed mechanism with a disc interposed between two rings coacting therewith through corresponding friction surfaces, and comprising a driving shaft to which said disc is attached and a driven shaft parallel to said driving shaft and rigid with a drum in which said rings are mounted, said driven shaft being adapted to move transversely about a lay shaft parallel thereto for producing the desired speed variation, is characterized in that said rings are slidably mounted in inner supports concentric to said drum, one of said supports being adapted to perform an axial movement coacting with a resilient member tending in its inoperative position to permit the release of said rings, said one support being responsive to an adjustable axial pressure for clamping said rings against said disc and eliminate any slip during the operation of the transmission.

Other features of the invention will appear as the following description proceeds; this description relates to a specific form of embodiment of this variable-speed transmission for automobile vehicle shown by way of example in the attached drawing, in which:

FIG. 1 is a longitudinal section showing the transmission and taken along the line I—I of FIG. 2;

FIG. 4 is a longitudinal section taken along the line IV—IV of FIG. 3;

FIG. 5 is another section taken along the line V—V of FIG. 3;

FIG. 8 is a detail view showing one portion of the mechanism of FIG. 1.

Figure 2:
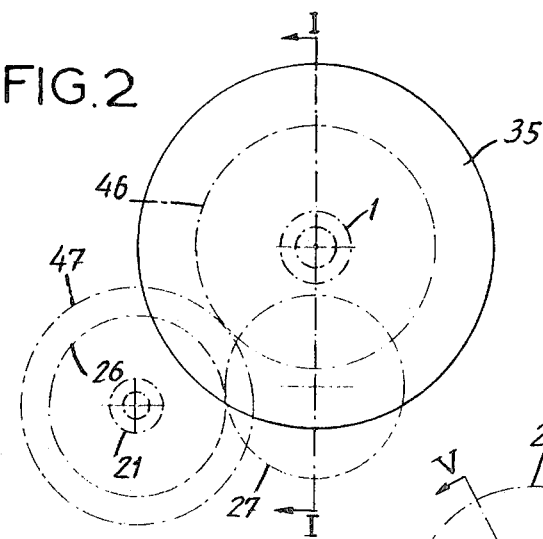
FIG. 2 is a diagrammatic end view showing the kinematic chain of the transmission of FIG. 1, with the elements thereof in the position corresponding to the forward drive.

As shown in FIG. 1, the movement of the driving shaft 1 of the transmission, which is rotatably rigid with the output shaft of an engine (not shown) is transmitted to the driving disc 2 of a first variable-speed stage, this disc 2 being mounted on a cone and tightened by means of a nut 2a to said shaft.

A pair of rings 3 and 4 are disposed on either side of the disc 2 of frustoconical radial sectional contour and comprise friction surfaces adapted to coact with the friction surfaces of the disc.

These rings are mounted in frictional engagement in supports secured to and within a drum 5 rigid with a driven shaft 6 carrying a pinion 7. These supports consist the one of a plate 8 rotatably solid with said drum through splines and axially retained by a resilient ring 9, and the other of a piston 12. A flexible diaphragm 10 rotatably solid with said drum through peripheral teeth engaging splines formed in said drum is disposed between said ring and said support. This diaphragm 10 is axially spaced from plate 8 by a distance ring 11 and in its inoperative position it urges the rings to their release position in relation to the disc. The piston 12 is provided with a rod 13 sliding in fluidtight engagement in the shaft 6 with the interposition of a bearing 14, said piston sliding in turn in a fluidtight manner, by virtue of a packing 15, in said drum so as to form therewith a chamber 16 adapted to receive a hydraulic fluid under an adjustable or controllable pressure.

As shown in FIG. 4, the assembly comprising said drum 5 and driven shaft 6 is trunnioned, with the interposition of bearings 17 and 18, in a casing 19 adapted to pivot angularly, with the interposition of bearings 20, about a lay shaft 21 of the transmission mechanism which is parallel to said driving and riven shafts 1 and 6; this lay shaft 21 is mounted in bearings 50 fitted in the stationary casing C of the transmission. It will be noted from the onset that in this arrangement the gear ratio is changed in a known manner and as described notably in the U.S. Pat. No. 3,387,507 to DeCastelet issued June 11, 1968, by causing for example a fluid pressure to move the piston of an actuator (not shown) rigid with said casing C but reacting against the casing 19, so as to cause this casing 19 to pivot about the lay shaft 21 and cause the rod 13 to move in a direction parallel to its axis. It will be noted that when the casing 19 is moved to set the drum 5 in an eccentric position with respect to shaft 1, it pivots against the effort exerted by the driving disc which, as a consequence of the axial stress, tends to return the driven rings to their centered position. A suitable value may be obtained for this fluid pressure by using an automatic governor of the type described in the French Pat. No. 1,232,550.

The chamber 16 may be supplied with fluid under an adjustable pressure via a duct 55 formed in said drum 5 and by causing said chamber 16 to communicate permanently with the annular space formed between this drum and its bearings 17 in casing 19, the latter comprising a corresponding fluid supply orifice 56.

Figure 3:
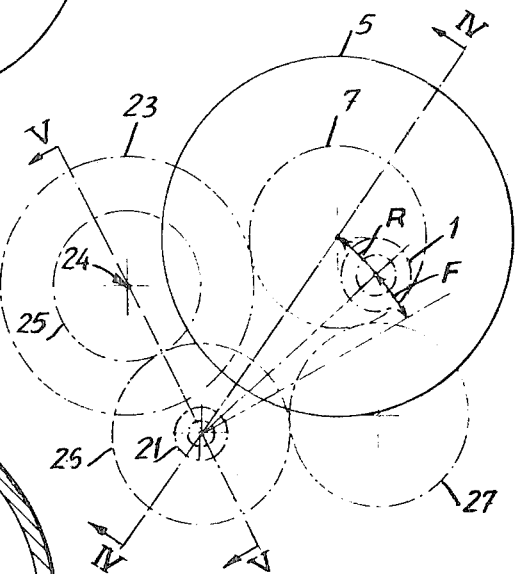
FIG. 3 is a diagrammatic end view similar to FIG. 2 but illustrating the kinematic chain of the transmission in the position corresponding to the reverse drive operation.
Figure 6:
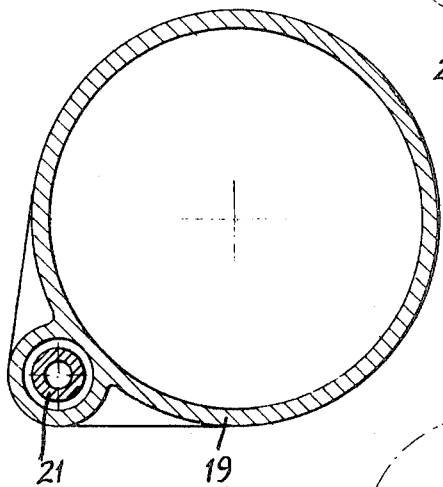
FIG. 6 is a sectional view of the tilting casing of the transmission, the section being taken along the line VI—VI of FIG. 4.
Figure 7:
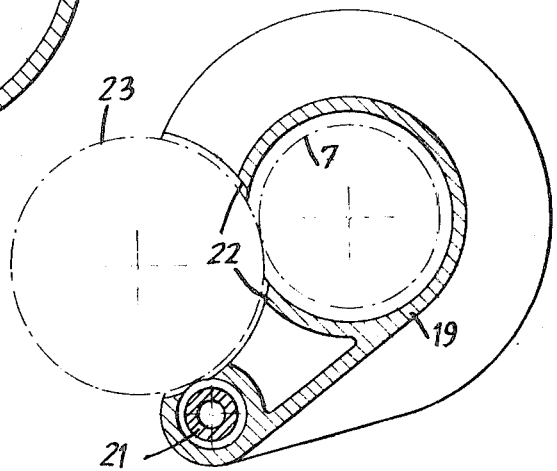
FIG. 7 is a section taken along the line VII—VII of FIG. 4.

Through a lateral aperture 22 provided to this end in the wall of casing 19 (see FIG. 7) the pinion 7 can mesh with the pinion 23 of the two-pinion lay shaft 24 mounted for loose rotation about a fixed axis in casing C, the other pinion 25 being adapted to mesh with a pinion 26 rigid with the lay shaft 21 and meshing in turn permanently with a pinion 27 rotatably rigid with the stub shaft of the driving bevel pinion 28 of a differential, which stub shaft is mounted through bearings 51 in the stationary casing C. This kinematic arrangement shown in FIG. 3 from pinion 7 to pinion 27 provides in this instance the reverse drive of the vehicle, and can be rendered either operative, by moving the casing 19 for example in the direction of the arrow R to bring pinion 7 in meshing engagement with pinion 23; or inoperative; in other words, in this case the reverse drive is obtained with the fixed gear ratio of the first stage of the variable-speed transmission, as determined by the eccentric position of drum 5 in relation to shaft 1 which is shown by the arrow R.

Under these conditions the transmission operates as follows:
The driving disc 2 is rotating and both rings 3 and 4 are released to their inoperative position by the free action of the flexible diaphragm 10; the vehicle is started from rest by gradually increasing the fluid pressure introduced into chamber 16.

As a result, the piston 12 exerts a thrust against the central portion of said diaphragm 10 and causes the rings 3 and 4 to clamp the disc 2. It will be noted that during the initial phase of this clamping action the rings mounted in frictional contact in their support begin to rotate, but this rotation is gradually impaired as the fluid pressure increases in chamber 16; this pressure is calculated to attain a value sufficient for causing the rings 3 and 4 to become rotatably rigid, by friction, with plate 8 and diaphragm 10, respectively.

It is clear that the gradual building up of this fluid pressure causes the variable-speed transmission to act not only as a progressive-action clutch when starting the vehicle from rest, but also as a torque limiting device responsive to the output torque of the first stage.

Moreover, in this transmission a second variable-speed stage is provided from rod 13 of piston 12 which comprises to this end an extension emerging from the driven shaft 6 and has secured to its free end a disc 30 fitted by means of a cone and tightened by a nut 31.

Coacting with this disc 30 are a pair of rings 33, 34 disposed on either side thereof and mounted in frictional contact in their support, one ring 33 being thus mounted directly in the flange of a rotary drum 35 constituting the output member of this second stage, and the other ring 34 being mounted in a piston 38. A flexible diaphragm 36 rotatably free with respect to said drum 35 is disposed within this drum and interposed between said piston 38 and ring 34. This diaphragm 36 is axially spaced from said drum flange by the provision of a distance ring 37, and in the inoperative condition it tends to release the rings 33 and 34 with respect to said disc 30.

The aforesaid piston 38 is slidably mounted in a cavity 39 formed in a plate 40 rotatably solid through splines with the drum 35 and retained in the axial direction within this drum between the diaphragm 36 and a spring ring 41.

Secured to the piston 38, for example by screwing, are ramp inserts 42 having the shape of annular segments, which are adapted to coact with rollers 43 rotatably mounted on radial stub shafts 44 carried by plate 40.

The piston 38 forms with its cavity 39 a chamber 45 adapted to receive fluid under pressure for a purpose to be explained presently, this fluid being adapted to be directed to the center of plate 40 though a union 57 provided with a sliding-contact packing and secured to a wall of the stationary casing C.

The drum 35 comprises an output pinion 46 constituting the first link of the kinematic chain providing the forward drive of the vehicle as illustrated in FIG. 2. This chain comprises a pinion 47 meshing with said pinion 46 and keyed to lay shaft 21, and is completed by pinions 26 and 27. Pinion 47 and its shaft 21 are carried by a bearing 52 fitted in casing C.

The above-described assembly operates as follows:
When no fluid pressure is exerted in chamber 45, the diaphragm 36 holds rings 33 and 34 in their released condition, and ramps 42 and rollers 43 are in their passive position, so that operating the first stage of the variable-speed transmission may actuate the reverse-drive kinematic chain as explained hereinabove, without actuating the second stage.

To start the vehicle equipped with this transmission in forward drive, fluid under a gradually increasing pressure is introduced into chamber 16, so that the first stage of the transmission will act as a clutch, as already explained in the foregoing, and simultaneously a control pressure is built up in chamber 45 for restoring the action of cam faces or ramps 42 and rollers 43 by causing the initial clamping of disc 30 by rings 33, 34 as a consequence of the resulting distortion of diaphragm 36, thus causing the rotation of piston 38 as a consequence of the frictional contact between ring 34 and diaphragm 36, and between this diaphragm 36 and piston 38, with the resultant operation of the assembly comprising said ramps 42 and rollers 43, so that the clamping of said disc by said rings is maintained by, and dependent on, this mechanical clamping action. Under these conditions, the torque is transmitted through the kinematic chain of FIG. 2 and a continuous variation of the gear ratio is obtained by causing the angular movement of casing 19 and therefore of drum 5 as illustrated by the arrow F of FIG. 3, the highest gear ratio corresponding to the maximum eccentric position of this drum 5 in relation to shaft 1, as defined by the arrow F, and being obtained initially by said actuator interposed between casings C and 19, the mutual alignment of shaft 1 and drum 5 corresponding to the direct drive.

It will also be seen that in the operative condition of the transmission a moderate slip is provided in the contact between piston 12 and diaphragm 10 to permit a relative rotation between the bearing 14 and the rod 13 of piston 12, in order to avoid any jamming or bracing of this piston notwithstanding the eccentric load supported thereby in all adjustment positions of casing 19 outside the position in which the axis of assembly 5, 6 and 12 is aligned with the axis of shaft 1.

The variable-speed transmission according to this invention is attended by inherent advantageous features. Thus, the torque received by the transmission rings is distributed to the driven drums or their resilient diaphragms which, when changing the gear ratio, operate in a frictionless manner. In fact, the fixedness of the driving discs and the application of the torque to the resilient diaphragm promote the easy penetration of the transmission rings into the first stage, and the penetration of the driving disc between the driving rings of the second stage. Under these conditions, changing the gear ratio during the transmission of a torque and controlling this change in a vehicle are extremely simplified. The transmission rings of the first stage are mounted for loose rotation and the friction torques between;
  the driving disc and the transmission rings,
  the transmission rings and the diaphragm, the transmission rings and the drum,
the diaphragm and the piston
are selected with a view to obtain a gradual clutch engagement and an accurate torque limiter, by using only the hydraulic pressure necessary for the torque transmission, the torque thus transmitted being directly proportional to, and dependent on, the pressure exerted for producing the clutch action or engagement.

Single-disc stages are used in this transmission, which are considerably less elaborate than those currently used in variable-speed transmission of this character, any interference caused by the frictional contact between the discs and their splines being thus eliminated while facilitating greatly the gradual gear change under load.

The axial pressure may be obtained by using hydraulic means and any desired regulation and control means may easily be used therefor.

A change speed and final-drive assembly constructed according to this invention has particularly reduced overall dimensions and is ea easily applicable to all vehicles.

Hydrodynamic bearings may also be used for the driven drums and also for the pivoting casing and its shaft.

An oil cooling and lubricating system can be devised very easily, notable by introducing oil into shaft 1 and piston rod 13 provided to this end with adequate ducts means.

Of course, various modifications and variations may be brought to the specific form of embodiment of the present invention which is shown and described herein, without departing from the scope of the invention as set forth in the appended claims.

We claim:

1. An improvement in variable-speed transmissions of the type having a disc interposed between a pair of rings which coact therewith through corresponding friction surfaces, a driving shaft to which said disc is attached, a driven shaft parallel to said driving shaft and rigid with a drum in which said rings are mounted, said driven shaft being adapted to move transversely about a lay shaft parallel thereto for producing the desired speed variation, said improvement comprising a support means for each said ring, said support means being within and concentric to said drum, at least one of said support means being rotatably solid with said drum, said rings being frictionally and rotatably mounted in said support means, at least one of said support means being movably mounted for axial movement, a resilient member biasing said movable support means towards a position in which said rings are out of engagement with said disc, and means to apply an adjustable axial pressure against said movable support means for clamping said rings against said disc thereby acting as a progressive-action clutch.

2. An improvement in variable-speed transmissions according to claim 1, wherein said at least one movable support means responsive to an adjustable axial pressure comprises a piston slidably mounted in said drum in response to application of a fluid under pressure thereagainst.

3. An improvement in variable-speed transmissions according to claim 1, wherein said at least one movable support means responsive to an adjustable axial pressure comprises an input member of a second variable-speed stage of the transmission mechanism.

4. An improvement in variable-speed transmissions according to claim 3, wherein said second stage of the transmission mechanism comprises a second movable support means mounted for movement in the axial direction, a second disc rigidly mounted on said second movable support means, two ring support means, a clamping frictionally mounted in each said ring support means for engagement with said second disc, an output drum for said second stage, one of said ring support means being rigid with said output drum, the other of said ring support means being mounted freely in said drum, a resilient member biasing said other ring support means towards an inoperative position with said clamping rings out of contact with said second disc, clamping ramp means rotatably solid with said drum acting on said other ring support means against said resilient biasing member and means to apply a fluid pressure against said other ring support means to initiate the clamping action resulting from the presence of said ramps.

* * * * *